(12) United States Patent
Al-Ahmed et al.

(10) Patent No.: US 12,479,609 B2
(45) Date of Patent: Nov. 25, 2025

(54) SELF-CHARGING UNMANNED AERIAL VEHICLE

(71) Applicant: KING FAHD UNIVERSITY OF PETROLEUM AND MINERALS, Dhahran (SA)

(72) Inventors: Amir Al-Ahmed, Dhahran (SA); Muhammad Hawwa, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 169 days.

(21) Appl. No.: 18/085,174

(22) Filed: Dec. 20, 2022

(65) Prior Publication Data

US 2024/0199248 A1    Jun. 20, 2024

(51) Int. Cl.
*B64U 50/34* (2023.01)
*B64C 39/02* (2023.01)
(Continued)

(52) U.S. Cl.
CPC ............ *B64U 50/34* (2023.01); *B64C 39/024* (2013.01); *B64U 20/90* (2023.01); *B64U 50/33* (2023.01); *H04W 4/40* (2018.02)

(58) Field of Classification Search
CPC ........ B64U 80/25; B64U 50/34; B64U 20/90; B64U 50/33; B64U 30/20; B64U 50/19; H04W 4/40; B64C 39/024
See application file for complete search history.

(56) References Cited

U.S. PATENT DOCUMENTS

| | | | |
|---|---|---|---|
| 2016/0311544 A1* | 10/2016 | Phan | B64D 1/22 |
| 2017/0057650 A1 | 3/2017 | Walter-Robinson | |

(Continued)

FOREIGN PATENT DOCUMENTS

| | | |
|---|---|---|
| CN | 205418126 U | 8/2016 |
| IN | 202141015440 A * | 10/2022 |

(Continued)

OTHER PUBLICATIONS

Machine Translation: WO-2020063450-A1 (Year: 2020).*
Machine Translation: KR-20190119805-A (Year: 2019).*

*Primary Examiner* — Anne Marie Antonucci
*Assistant Examiner* — Connor L Knight
(74) *Attorney, Agent, or Firm* — Oblon, McClelland, Maier & Neustadt, L.L.P.

(57) ABSTRACT

An unmanned aerial vehicle (UAV) is described. The UAV includes a first battery to power multiple first and multiple second electronic components of UAV. A power consumption of each first electronic component is greater than a power threshold. A power consumption of each second electronic component is less than or equal to the power threshold. The UAV includes a generator and a battery management system (BMS). The generator generates an electrical power through rotation of a shaft of a motor of UAV. The BMS charges the first battery using the electrical power generated by the generator when the UAV is during operation and a stored charge of the first battery drops to a first predefined level, and charges a second battery using the stored charge of the first battery when a stored charge of the second battery drops to a second predefined level.

18 Claims, 9 Drawing Sheets

(51) Int. Cl.
*B64U 20/90* (2023.01)
*B64U 50/33* (2023.01)
*H04W 4/40* (2018.01)

(56) References Cited

U.S. PATENT DOCUMENTS

| | | | |
|---|---|---|---|
| 2018/0150072 A1 | 5/2018 | Boss et al. | |
| 2019/0197463 A1* | 6/2019 | Blake | B60L 53/20 |
| 2019/0340569 A1* | 11/2019 | Prager | G06Q 10/06315 |
| 2020/0283141 A1* | 9/2020 | Foster | B64U 50/34 |
| 2021/0094441 A1* | 4/2021 | Sampson | B60K 1/02 |
| 2021/0276723 A1* | 9/2021 | Han | B64D 27/24 |
| 2022/0274493 A1* | 9/2022 | Dunn | H01M 10/4257 |
| 2023/0102313 A1* | 3/2023 | Yokoyama | B64C 39/024 |
| | | | 348/372 |
| 2023/0303274 A1* | 9/2023 | Foster | B64C 11/305 |
| 2023/0331405 A1* | 10/2023 | Pamula | B64C 39/024 |

FOREIGN PATENT DOCUMENTS

| | | | |
|---|---|---|---|
| KR | 20190119805 A * | 10/2019 | |
| KR | 10-2172335 B1 | 11/2020 | |
| KR | 10-2212086 B1 | 2/2021 | |
| WO | 2014/020596 A1 | 2/2014 | |
| WO | WO-2020063450 A1 * | 4/2020 | G05D 1/101 |

\* cited by examiner

SELF-CHARGING UNMANNED AERIAL VEHICLE

BACKGROUND

Field of the Invention

The present disclosure is directed to a self-charging unmanned aerial vehicle (UAV) and a method of operating the UAV.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

An unmanned aerial vehicle (UAV), commonly known as a drone, is an aircraft without any human pilot, crew, or passengers on board. Increasing advancements in UAVs have been seen in recent years. UAVs carrying a range of technologies for sensing and communication are becoming popular in places where a human cannot reach or is unable to perform in a timely and efficient manner. In examples, UAVs may be used in commercial and non-profits sectors. For example, UAVs may be used in agriculture, conservation, delivery and logistics, disaster mitigation and relief, photography and filmmaking, law enforcement and border control surveillance, real estate management, and security industry.

UAVs are typically powered by an onboard battery supply. In examples, UAVs may use a number of rotary motors (e.g., brushless motors) for their operation. Each motor is battery operated to rotate a propeller mounted on it. However, UAVs have short flying times due to their dependency on onboard, limited capacity batteries for power supply. This implies that UAVs need to make frequent trips to ground charging stations so their batteries can be replaced or recharged before flying again, which creates significant service disruptions. To reduce the disruption, recharging the batteries using ambient energy harvesting techniques is considered as a core technology for operational UAVs. The energy limitation issue is largely being addressed through the design and optimization of algorithms and motion control functions to achieve energy efficiency. While such efforts are helpful, they do not fundamentally solve the problem since the UAVs would still need to fly away from their missions and return to ground charging stations when the batteries eventually drain out.

Accordingly, it is one object of the present disclosure to improve the battery performance and capacity of the UAVs.

SUMMARY

In an exemplary embodiment, an unmanned aerial vehicle (UAV) is disclosed. The UAV includes a first battery configured to power a first plurality of electronic components of the UAV, a power consumption of each of the first plurality of electronic components being greater than a power threshold. The UAV further includes a second battery configured to power a second plurality of electronic components of the UAV, a power consumption of each of the second plurality of electronic components being less than or equal to the power threshold. The UAV also includes a generator configured to generate an electrical power through rotation of a shaft of a motor of the UAV, and a battery management system (BMS) configured to charge the first battery using the electrical power generated by the generator when the UAV is during operation and a stored charge of the first battery drops to a first predefined level, and charge the second battery using the stored charge of the first battery when a stored charge of the second battery drops to a second predefined level.

In an embodiment, the first plurality of electronic components includes at least one of the motor of the UAV and the BMS.

In an embodiment, the second plurality of electronic components includes at least one of a cooling system, a heating system, a wireless communication system, a lighting system, a sensing system, and a sound system.

In an embodiment, the cooling system of the UAV cools a moving part or a payload of the UAV when the sensing system detects that a temperature of the moving part or the payload of the UAV is higher than a first temperature threshold. In an example, the moving part of the UAV includes the shaft of the motor.

In an embodiment, the heating system of the UAV heats an electronic component or a payload of the UAV when the sensing system of the UAV detects that a temperature of the electronic component or the payload of the UAV is lower than a second temperature threshold.

In an embodiment, the wireless communication system of the UAV sends status data of the UAV to a ground station, and receives operation instructions from the ground station, the operation instructions being based on the status data of the UAV.

In an embodiment, the BMS of the UAV charges the second battery through a DC-DC convertor that is coupled to an output of the first battery.

In an embodiment, the BMS of the UAV charges the first battery through an AC-DC convertor that is coupled to a charging port of the UAV when the UAV is not during operation.

In an embodiment, the BMS of UAV controls the generator to generate the electrical power through an electronic switch that is coupled between the generator and the shaft of the motor.

In another exemplary embodiment, a method of operating a UAV is disclosed. The method includes powering, by a first battery of the UAV, a first plurality of electronic components of the UAV, a power consumption of each of the first plurality of electronic components being greater than a power threshold; powering, by a second battery of the UAV, a second plurality of electronic components of the UAV, a power consumption of each of the second plurality of electronic components being less than or equal to the power threshold; generating, by a generator of the UAV, an electrical power through rotation of a shaft of a motor of the UAV; charging, by a BMS of the UAV, the first battery using the electrical power generated by the generator when the UAV is during operation and a stored charge of the first battery drops to a first predefined level; and charging, by the BMS of the UAV, the second battery using the stored charge of the first battery when a stored charge of the second battery drops to a second predefined level.

In an embodiment, the second plurality of electronic components includes at least one of a cooling system, a heating system, a wireless communication system, a lighting system, a sensing system, and a sound system.

In an embodiment, the method further includes cooling, by the cooling system of the UAV, a moving part or a payload of the UAV when the sensing system of the UAV detects that a temperature of the moving part or the payload of the UAV is higher than a first temperature threshold. In an example, the moving part of the UAV includes the shaft of the motor.

In an embodiment, the method further includes heating, by the heating system of the UAV, an electronic component or a payload of the UAV when the sensing system of the UAV detects that a temperature of the electronic component or the payload of the UAV is lower than a second temperature threshold.

In an embodiment, the method further includes sending, by the wireless communication system of the UAV, status data of the UAV to a ground station, and receiving, by the wireless communication system of the UAV, operation instructions from the ground station, the operation instructions being based on the status data of the UAV.

In an embodiment, the method further includes charging, by the BMS of the UAV, the second battery through a DC-DC convertor that is coupled to an output of the first battery.

In an embodiment, the method further includes charging, by the BMS of the UAV, the first battery through an AC-DC convertor that is coupled to a charging port of the UAV when the UAV is not during operation.

In an embodiment, the method further includes controlling, by the BMS of the UAV, the generator to generate the electrical power through an electronic switch that is coupled between the generator and the shaft of the motor.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
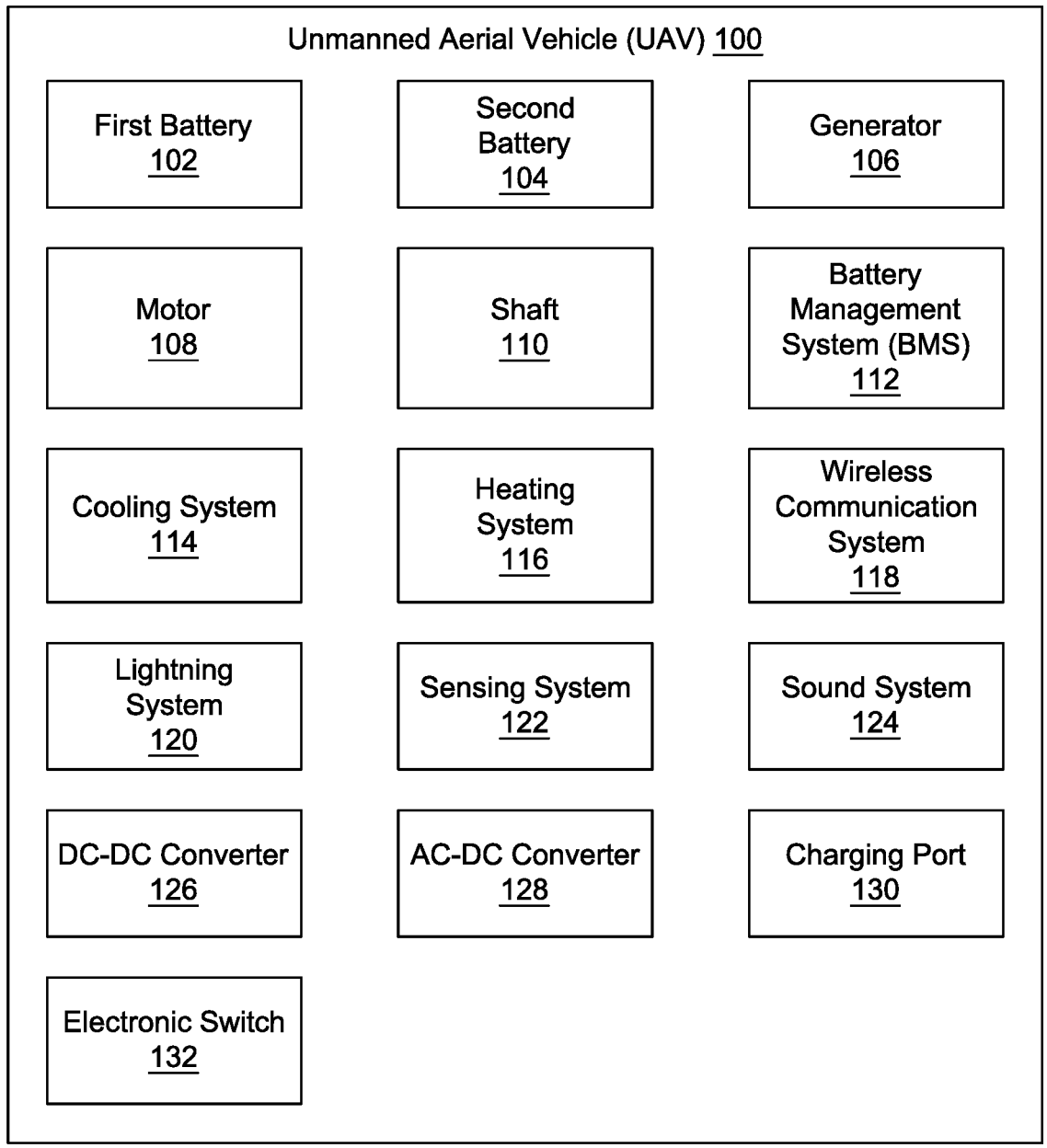
FIG. 1A depicts a block diagram of an unmanned aerial vehicle (UAV), according to aspects of the present disclosure.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a self-charging unmanned aerial vehicle (UAV) and a method of operating the UAV.

FIG. 1 depicts a block diagram of a UAV 100, according to aspects of the present disclosure.

According to an aspect, the UAV 100 may be a two-battery based system. In an embodiment, the UAV 100 can include a first battery 102 and a second battery 104. In an example, the first battery 102 can be a primary battery. The primary battery can be a high power application battery. The first battery 102 can be an advanced Lithium-ion (Li-ion) or Li-based solid-state battery. In an example, the second battery 104 can be a secondary battery, and can be a low power application battery.

Further, in an embodiment, the UAV 100 can include a generator 106, a motor 108, and a shaft 110. The generator 106 can be connected to the motor 108 through the shaft 110. According to an embodiment, the generator 106 can be configured to generate electrical power through rotation of the shaft 110 of the motor 108 of the UAV 100. In an example, the motor 108 can be a high speed motor. In an aspect, capacity of the first battery 102, the second battery 104, the generator 106, and the motor 108 can be calculated based on requirements of the UAV 100.

Although, the single generator 106 and the single motor 108 are shown to be included in the UAV 100, in some embodiments, the UAV 100 can include multiple generators and motors. In an example, the UAV 100 can include one (1), two (2), three (3), four (4), six (6), or more motors. In an embodiment, for all one (1), two (2), three (3), four (4), six (6), or more motors based UAV 100, there can be one (1), two (2), three (3), four (4), six (6), or more or less number of generators as per the calculated capacity.

In an embodiment, the UAV 100 can include a battery management system (BMS) 112. The BMS 112 can be any electronic system that manages the first battery 102 and the second battery 104. In examples, the BMS 112 can monitor and control the charging and discharging of the first battery 102 and the second battery 104. The BMS 112 can monitor and control the overall performance of the first battery 102 and the second battery 104, and other parameters of the first battery 102 and the second battery 104.

According to an embodiment, the UAV 100 may further include a cooling system 114, a heating system 116, a wireless communication system 118, a lighting system 120, a sensing system 122, a sound system 124, a Direct Current (DC)-DC converter 126, an Alternating Current (AC)-DC converter 128, a charging port 130, and an electronic switch 132.

In an embodiment, the cooling system 114 can be a pneumatic (e.g., using compressed cooling air), or liquid (e.g., using a circulated cold water as coolant), or gel (e.g., using a gel cooling pad) based system. In examples, during operation of the UAV 100, one or more of the moving parts of the UAV 100 can reach high temperature, and these moving parts are cooled to a desired temperature range. Also, one or more of the payloads can require cooling during delivery. According to an embodiment, the cooling system 114 of the UAV 100 can be configured to cool a moving part or a payload of the UAV 100 when the sensing system 122 detects that a temperature of the moving part or the payload of the UAV 100 is higher than a first temperature threshold. In an example, the moving part of the UAV 100 can include the shaft 110 of the motor 108.

When the cooling system is pneumatic it may contain a compressed gas in liquid form such as a low boiling hydrocarbon (isopentane, propane and/or butane) or more preferably a refrigerant gas such as a CFC, HFC, HFO or HCFC such as R134a, R143a, R407a, R407c, R410a, R22, R123, R32, R290, R600a, R1234ze, etc. Most preferably the pneumatic system includes compressed carbon dioxide in the form of cartridges. Upon detecting a condition in which the temperature exceeds a threshold, the carbon dioxide cylinder is opened to release a cooling stream of gas. The carbon dioxide cartridges are preferably mounted on a top surface (sun-facing) of the UAV. The gas outlet may be directly to an area in need of cooling by tubing. For example, carbon dioxide cartridges are mounted on the top surface of the UAV with a discharge end connect to tubing to delivering a cool gas stream to a payload mounted under a bottom surface of the UAV and/or to deliver a cooling gas stream to an internal component of the UAV.

The gel cooling pad is configured as an attachment that is placed directly adjacent to an area in need of cooling or temperature regulation. The gel pad may contain, for example, a material such as a mixture of diethylene glycol, ethylene glycol and/or propylene glycol that is pre-frozen and absorbs heat from the UAV as it melts.

According to an embodiment, during high-altitude flying of the UAV 100, one or more electronic components of the UAV 100 and the payload can require heating. In an embodiment, the heating system 116 of the UAV 100 can be configured to heat an electronic component or a payload of the UAV 100 when the sensing system 122 of the UAV 100 detects that the temperature of the electronic component or the payload of the UAV 100 is lower than a second temperature threshold.

In an embodiment, the wireless communication system 118 of the UAV 100 can be configured to send status data of the UAV 100 to a ground station. Further, the wireless communication system 118 can be configured to receive operation instructions from the ground station. In an example, the operation instructions can be based on the status data of the UAV 100. According to an embodiment, the lighting system 120 can include LEDs and other light sources. In an example, the lighting system 120 can illuminate a scene, an object, or an area. In an embodiment, the sensing system 122 can include one or more sensors to collect data. Examples of the one or more sensors include, but are not limited to, global positioning system (GPS) sensors, motion sensors, inertial sensors, proximity sensors, and image sensors. According to an embodiment, the sound system 124 can include a speaker configured to broadcast acoustic signals. The DC-DC converter 126 is an electronic device that converts a source of DC from one voltage level to another. The AC-DC converter 128 is a solid-state AC-to-AC converter that converts an AC waveform to another AC waveform, where the output voltage and frequency can be set based on requirements.

Figure 1B:
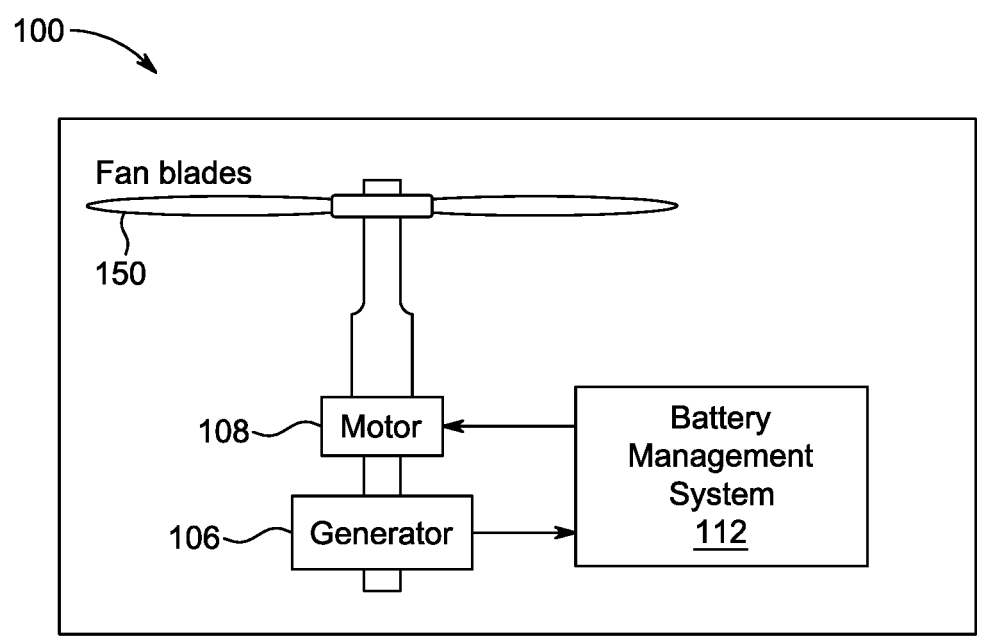
FIG. 1B depicts a schematic diagram of the UAV, according to aspects of the present disclosure.

FIG. 1B depicts a schematic diagram of the UAV 100, according to aspects of the present disclosure.

As shown in FIG. 1B, the UAV 100 includes the generator 106, the motor 108, the battery management system 112, and fan blades 150. The BMS 112 can be connected to the motor 108 and the generator 106. In an embodiment, the generator 106 can be configured to generate an electrical power through rotation of the shaft 110 of the motor 108 of the UAV 100. The electrical power is generated by converting mechanical energy to electrical energy. The motor rotation drives the generator 106. The motor rotation drive is a mechanical energy that drives the generator 106. The generator 106 can include field windings that create a magnetic field due to the rotation of the motor 108. The generator 106 includes a conductor that moves in the magnetic field cutting the magnetic lines of forces inducing an electromagnetic force (EMF). The EMF causes a current to flow when the conductor circuit is closed. This is based on Faraday's law of electromagnetic induction. The construction of the generator 106 is not shown as the construction and operation of the generator 106 is known.

In other embodiments the generator may include or function as an alternate means of providing electrical current to the UAV and/or to an electrical storage system such as a battery. One or more photovoltaic cells may be mounted on a top surface (sun-facing) of the UAV. As the UAV is operated, the cells generate electricity thereby providing additional electrical power to the UAV systems and/or charging one or more batteries therein.

Preferably the generator is modulated such that it is in use at a time when the motor is not drawing electric power from the system. In this respect the generator may be engaged at a time when one or more of the propellers of the UAV is not drawing power. For example, when the UAV is hovering or descending and requires relatively lower power in comparison to the power requirements needed for acceleration or lift. Rotation provided by the propeller that is not under power can be utilized to turn the generator thereby providing an electrical current to recharge onboard systems.

Figure 2:
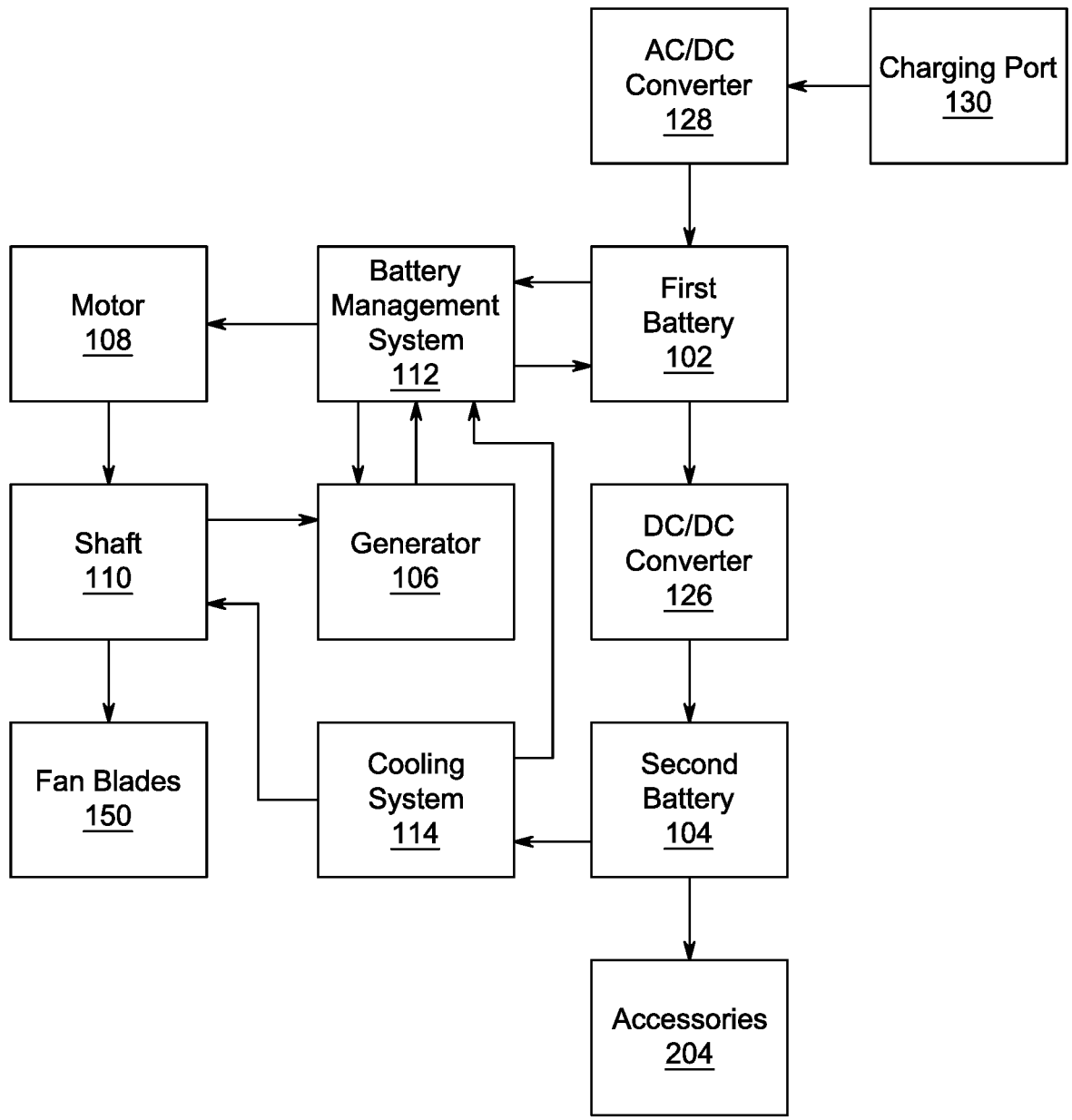
FIG. 2 depicts an assembly of various components of the UAV, according to aspects of the present disclosure.

FIG. 2 depicts a circuit architecture comprising an assembly of various components of the UAV 100, according to an exemplary aspect of the present disclosure.

According to an embodiment, the first battery 102 of the UAV 100 can be charged from the charging port 130 when the UAV 100 is not being operated (i.e., before flying). In an embodiment, the first battery 102 of the UAV 100 can be charged and discharged during operation/flight as needed through by the generator 106 connected to the shaft 110 of the motor 108 of the UAV 100. In an aspect, the operation of the charging and discharging of the UAV 100 can be controlled by the BMS 112. In an embodiment, the BMS 112 can be configured to charge the first battery 102 through the AC-DC converter 128 that is coupled to the charging port 130 of the UAV 100 when the UAV 100 is not under operation.

According to an embodiment, the second battery 104 can be recharged by the first battery 102, and the operation can be controlled by the BMS 112. In an embodiment, the BMS 112 can be configured to charge the second battery 104 through the DC-DC converter 126 that is coupled to an output of the first battery 102.

In an embodiment, the first battery 102 can be configured to power a first plurality of electronic components of the UAV 100. Power consumption of each of the first plurality of electronic components can be greater than a power threshold. In an example, the first plurality of electronic components can include at least one of the motor 108 of the UAV 100 and the BMS 112.

In an embodiment, the second battery 104 can be configured to power a second plurality of electronic components of the UAV 100. Power consumption of each of the second plurality of electronic components can be less than or equal to the power threshold. In an example, the second plurality of electronic components can include at least one of the cooling system 114, the heating system 116, the wireless communication system 118, the lighting system 120, the sensing system 122, and the sound system 124.

According to an embodiment, the generator 106 can be configured to generate electrical power through the rotation of the shaft 110 of the motor 108 of the UAV 100. Further, in an embodiment, the BMS 112 can charge the first battery 102 using the electrical power generated by the generator 106 when the UAV 100 is under operation and a stored charge of the first battery 102 drops to a first predefined level. The BMS 112 can also be configured to charge the second battery 104 using the stored charge of the first battery 102 when a stored charge of the second battery 104 drops to a second predefined level. The UAV 100 can include accessories 204 that include wires, circuits, computing components and payloads that may or may not be required for the operation of the UAV 100.

Figure 3:
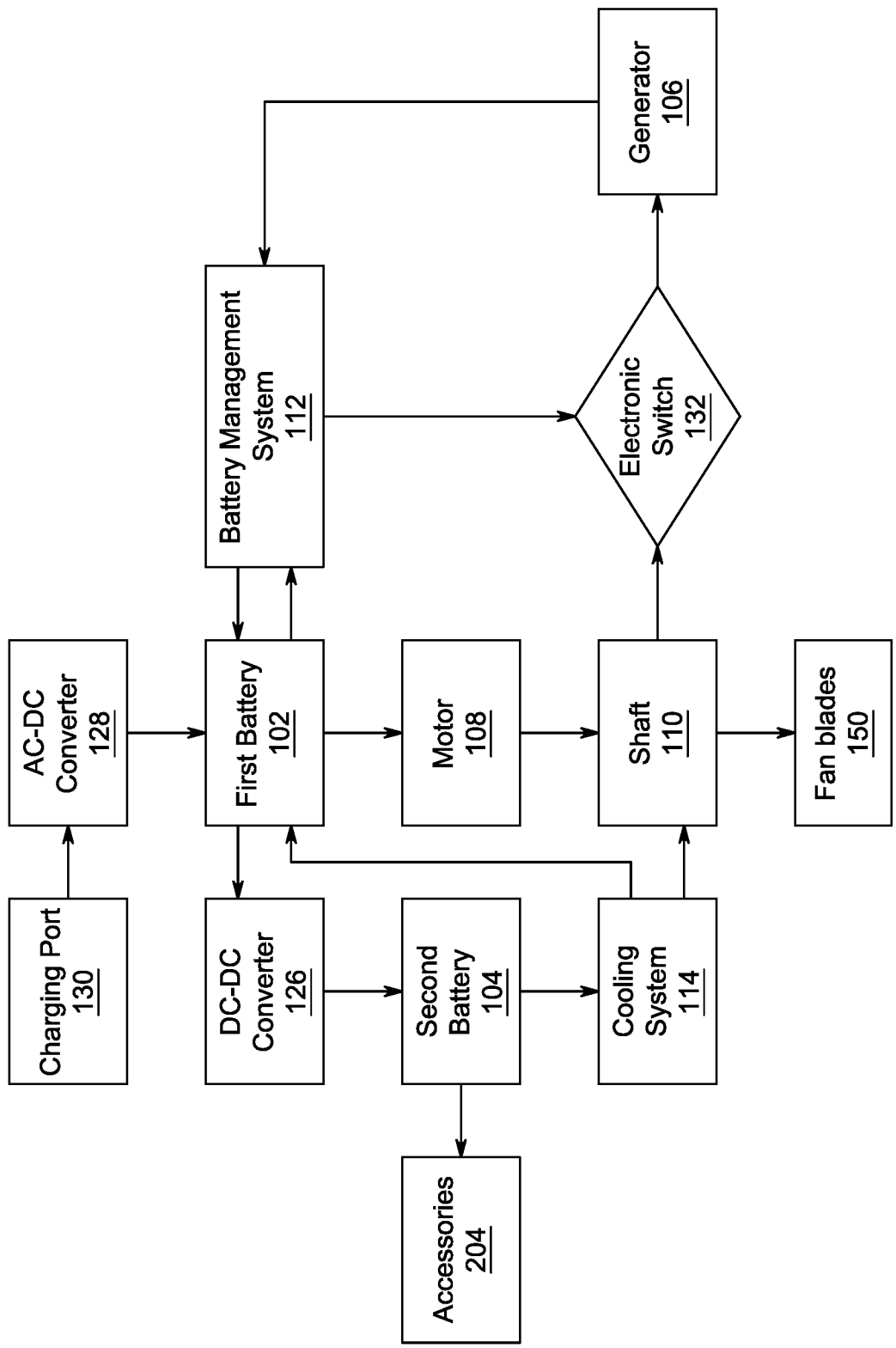
FIG. 3 depicts another assembly of various components of the UAV, according to aspects of the present disclosure.

FIG. 3 depicts a second circuit architecture comprising an assembly of various components of the UAV 100, according to aspects of the present disclosure.

According to an aspect, the BMS 112 of the UAV 100 can control the generator 106 to generate the electrical power through the electronic switch 132 that is coupled between the generator 106 and the shaft 110 of the motor 108. The electronic switch 132 can assist in reducing the load or the mechanical stretch on the motor 108 and the shaft 110. The BMS 112 can control the electronic switch 132 to start and stop the generator 106 as needed for the recharging process. The electronic switch 132 can improve the overall performance of the UAV 100. Also, the UAV 100 can be operated without any interruption of recharging or battery replacement. As a result, the UAV 100 can be operated for long hours. Also, the operation efficiency of the UAV 100 is increased. The operation cost of the UAV 100 is reduced.

Figure 4:
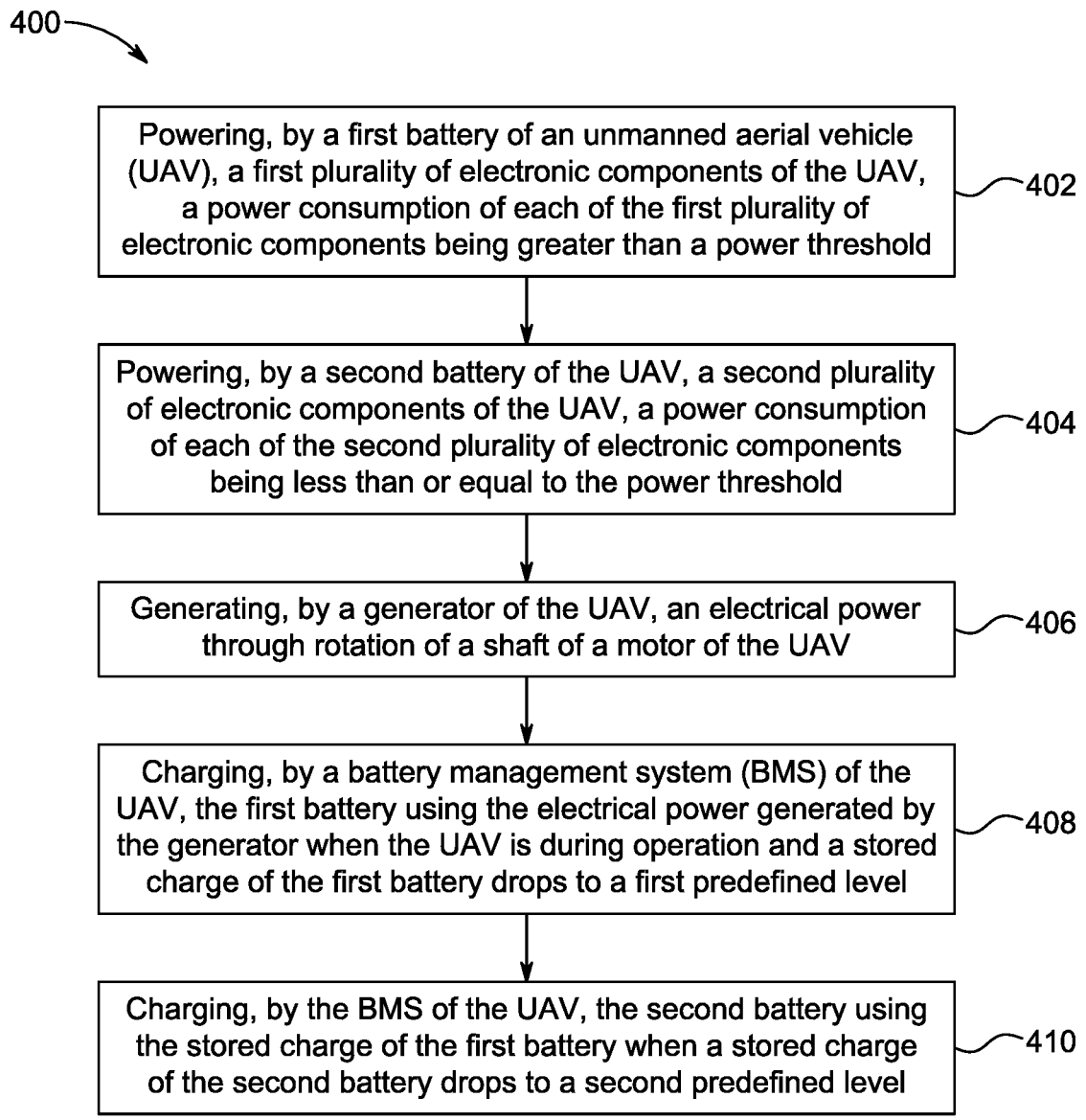
FIG. 4 illustrates a method of operating the UAV, according to aspects of the present disclosure.

FIG. 4 illustrates a method 400 of operating a UAV (e.g., the UAV 100), according to aspects of the present disclosure.

At step 402, the method 400 includes powering, by a first battery (e.g., the first battery 102) of the UAV, a first plurality of electronic components of the UAV, a power consumption of each of the first plurality of electronic components being greater than a power threshold. In an example, the first plurality of electronic components can include at least one of a motor (e.g., the motor 108) and a BMS (e.g., the BMS 112).

At step 404, the method 400 includes powering, by a second battery (e.g., the second battery 104) of the UAV, a second plurality of electronic components of the UAV, a power consumption of each of the second plurality of electronic components being less than or equal to the power threshold. In an example, the second plurality of electronic components can include at least one of a cooling system (e.g., the cooling system 114), a heating system (e.g., the heating system 116), a wireless communication system (e.g., the wireless communication system 118), a lighting system (e.g., the lighting system 120), a sensing system (e.g., the sensing system 122), and a sound system (e.g., the sound system 124).

At step 406, the method 400 includes generating, by a generator (e.g., the generator 106) of the UAV, an electrical power through rotation of a shaft (e.g., the shaft 110) of the motor of the UAV. According to an aspect, the BMS of the UAV can control the generator to generate the electrical power through an electronic switch (e.g., the electronic switch 132) that is coupled between the generator and the shaft of the motor.

At step 408, the method 400 includes charging, by the BMS of the UAV, the first battery using the electrical power generated by the generator when the UAV is during operation and a stored charge of the first battery drops to a first predefined level. According to an aspect, the BMS of the UAV can charge the first battery through an AC-DC converter (e.g., the AC-DC converter 128) that is coupled to a charging port (e.g., the charging port 130) of the UAV when the UAV is not during operation.

At step 410, the method 400 includes charging, by the BMS of the UAV, the second battery using the stored charge of the first battery when a stored charge of the second battery drops to a second predefined level. In an aspect, the BMS of the UAV can charge the second battery through a DC-DC converter (e.g., the DC-DC converter 126) that is coupled to an output of the first battery.

According to one or more aspects, the method 400 can include cooling, by the cooling system of the UAV, a moving part or a payload of the UAV when the sensing system of the UAV detects that a temperature of the moving part or the payload of the UAV is higher than a first temperature threshold. In an example, the moving part of the UAV can include the shaft of the motor. Further, according to one or more aspects, the method 400 includes heating, by the heating system of the UAV, an electronic component or a payload of the UAV when the sensing system of the UAV detects that a temperature of the electronic component or the payload of the UAV is lower than a second temperature threshold. Also, the method 400 can include sending, by the wireless communication system of the UAV, status data of the UAV to a ground station, and receiving, by the wireless communication system of the UAV, operation instructions from the ground station, the operation instructions being based on the status data of the UAV.

Figure 5:
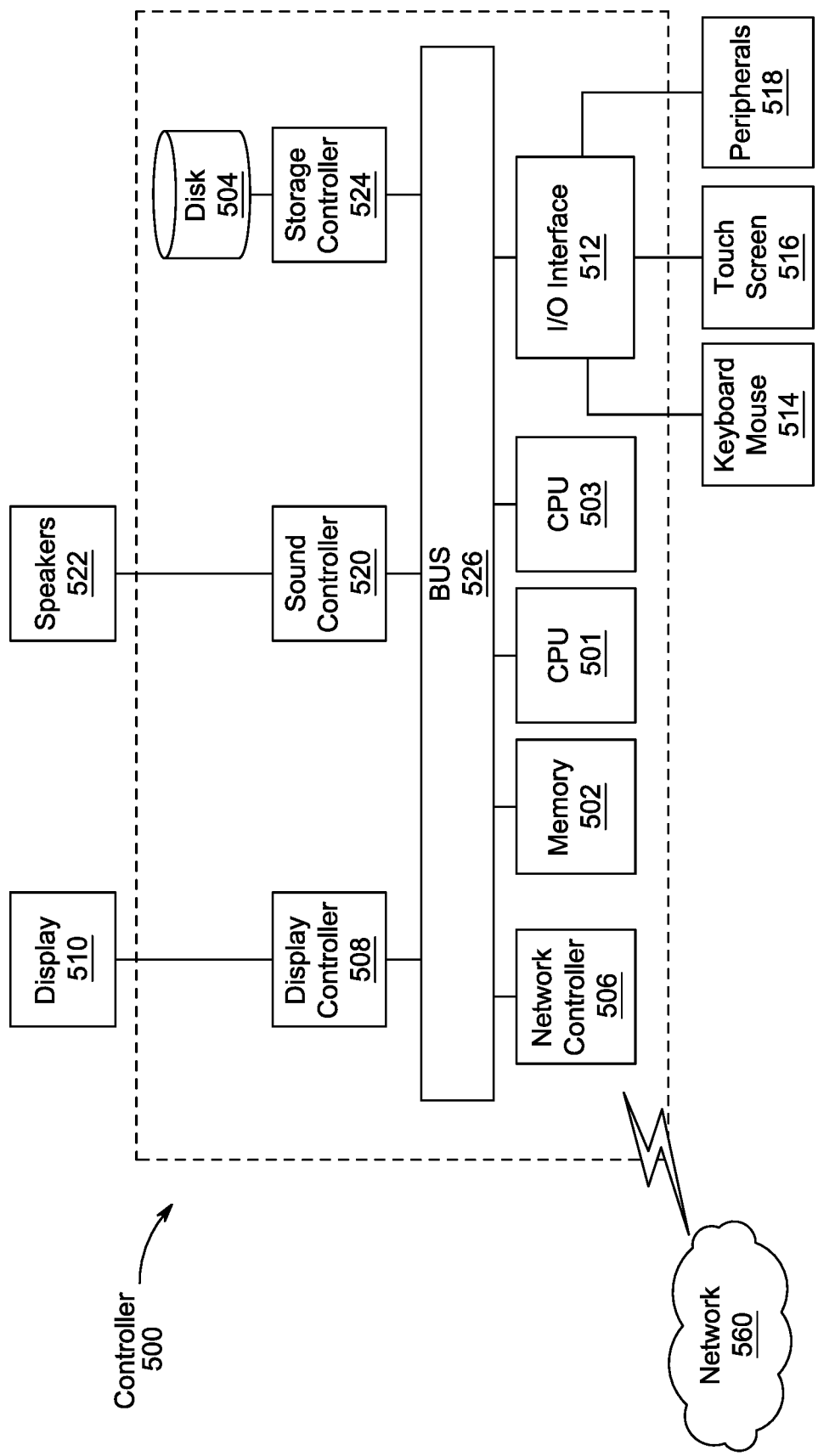
FIG. 5 is an illustration of a non-limiting example of details of computing hardware used in the computing system, according to aspects of the present disclosure.

FIG. 5 is an illustration of a non-limiting example of details of computing hardware used in the computing system, according to exemplary aspects of the present disclosure. In FIG. 5, a controller 500 is described which is a computing device (for example, that BMS 112) that includes a CPU 501 which performs the processes described above/below. The process data and instructions can be stored in memory 502. These processes and instructions can also be stored on a storage medium disk 504 such as a hard drive (HDD) or portable storage medium or can be stored remotely.

Further, the claims are not limited by the form of the computer-readable media on which the instructions of the inventive process are stored. For example, the instructions can be stored on CDs, DVDs, in FLASH memory, RAM, ROM, PROM, EPROM, EEPROM, hard disk or any other information processing device with which the computing device communicates, such as a server or computer.

Further, the claims can be provided as a utility application, background daemon, or component of an operating system, or combination thereof, executing in conjunction with CPU 501, 503 and an operating system such as Microsoft Windows 7, UNIX, Solaris, LINUX, Apple MAC-OS and other systems known to those skilled in the art.

The hardware elements in order to achieve the computing device can be realized by various circuitry elements, known to those skilled in the art. For example, CPU 501 or CPU 503 can be a Xenon or Core processor from Intel of America or an Opteron processor from AMD of America, or can be other processor types that would be recognized by one of ordinary skill in the art. Alternatively, the CPU 501, 503 can be implemented on an FPGA, ASIC, PLD or using discrete logic circuits, as one of ordinary skill in the art would recognize. Further, CPU 501, 503 can be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN sub-networks. The network 560 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 508, such as a NVIDIA Geforce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computing device such as Sound Blaster X-Fi Titanium from Creative, to interface with speakers/microphone 522 thereby providing sounds and/or music.

The general-purpose storage controller 524 connects the storage medium disk 504 with communication bus 526, which can be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure can be replaced with other elements and structured differently than the examples provided herein. Moreover, circuitry configured to perform features described herein can be implemented in multiple circuit units (e.g., chips), or the features can be combined in circuitry on a single chipset, as shown on FIG. 6.

Figure 6:
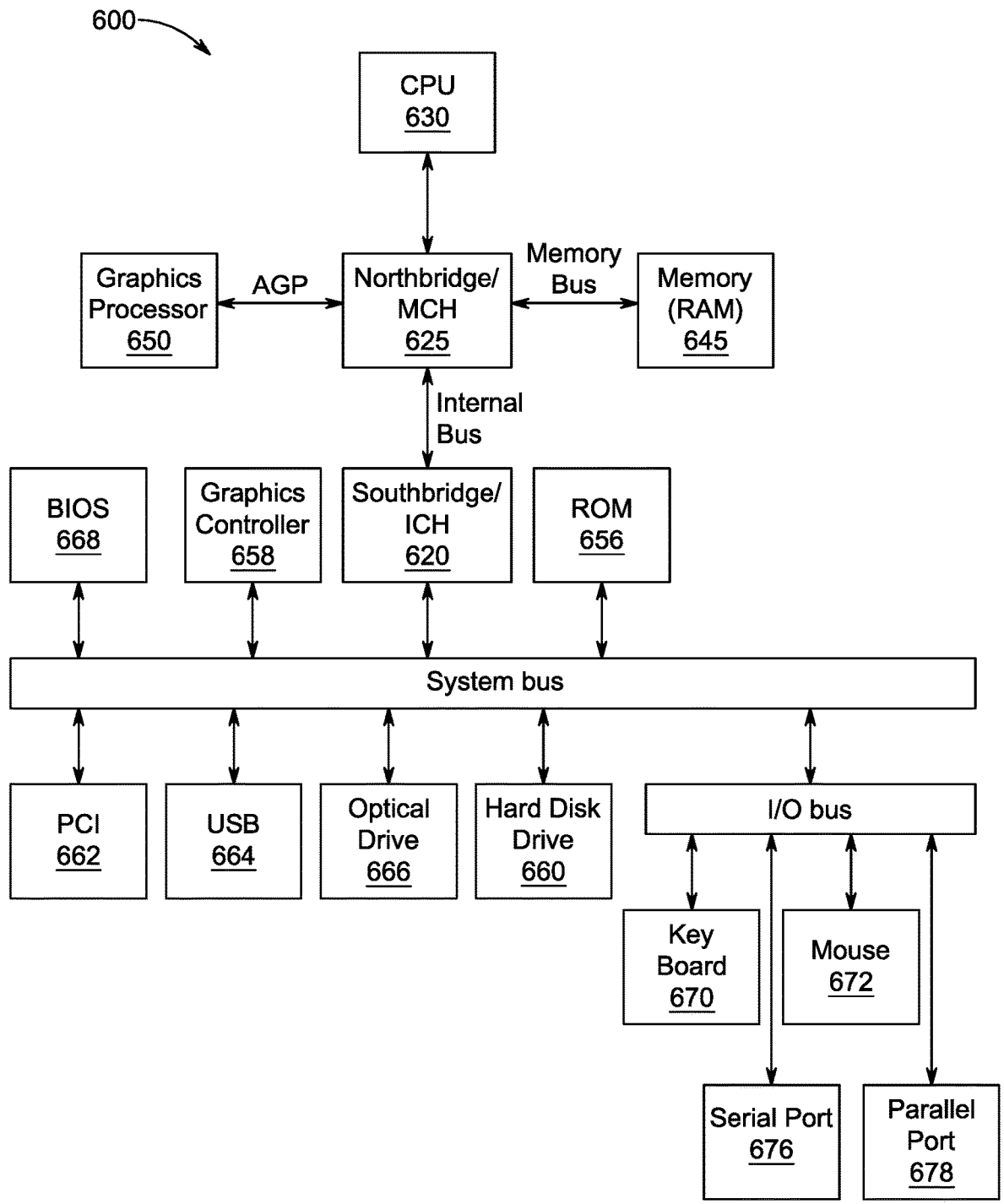
FIG. 6 is an exemplary schematic diagram of a data processing system used within the computing system, according to aspects of the present disclosure.

FIG. 6 shows a schematic diagram of a data processing system 600 used within the computing system, according to exemplary aspects of the present disclosure. The data processing system 600 is an example of a computer in which code or instructions implementing the processes of the illustrative aspects of the present disclosure can be located. In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 can contain one or more processors and even can be implemented using one or more heterogeneous processor systems.

Figure 7:
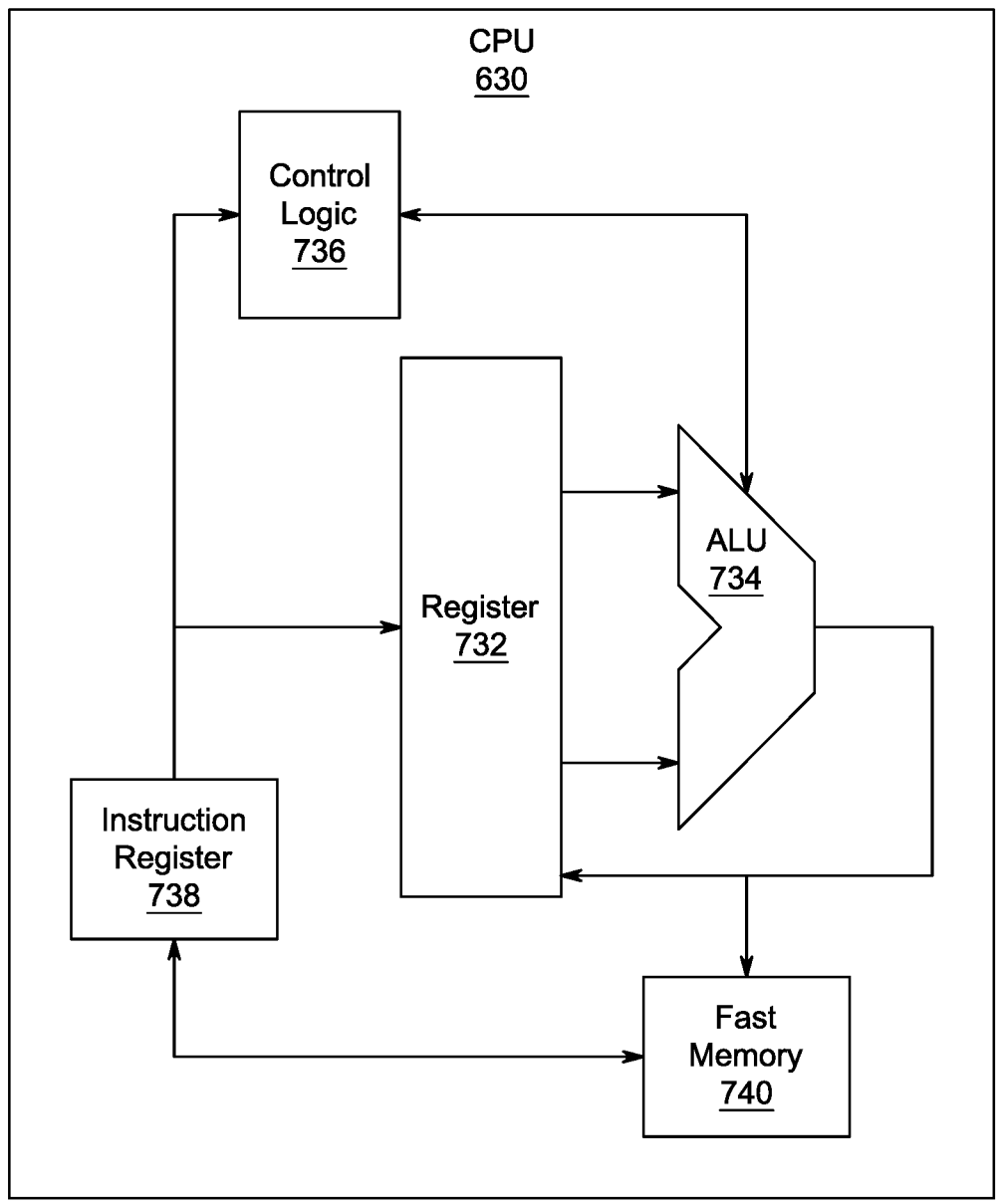
FIG. 7 is an exemplary schematic diagram of a processor used with the computing system, according to aspects of the present disclosure.

For example, FIG. 7 shows one aspects of the present disclosure of CPU 630. In one aspects of the present disclosure, the instruction register 738 retrieves instructions from the fast memory 740. At least part of these instructions is fetched from the instruction register 738 by the control logic 736 and interpreted according to the instruction set architecture of the CPU 630. Part of the instructions can also be directed to the register 730. In one aspects of the present disclosure the instructions are decoded according to a hard-wired method, and in another aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain aspects of the present disclosures, the instruction set architecture of the CPU 630 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices 662 can also be coupled to SB/ICH 620 through a PCI bus 762.

The PCI devices 662 can include, for example, Ethernet adapters, add-in cards, and PC cards for notebook computers. The Hard disk drive 660 and CD-ROM 656 can use, for example, an integrated drive electronics (IDE) or serial advanced technology attachment (SATA) interface. In one aspects of the present disclosure the I/O bus can include a super I/O (SIO) device.

Further, the hard disk drive (HDD) 660 and optical drive 666 can also be coupled to the SB/ICH 620 through a system bus. In one aspects of the present disclosure, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein can be adapted based on changes on battery sizing and chemistry, or based on the requirements of the intended back-up load to be powered.

Figure 8:
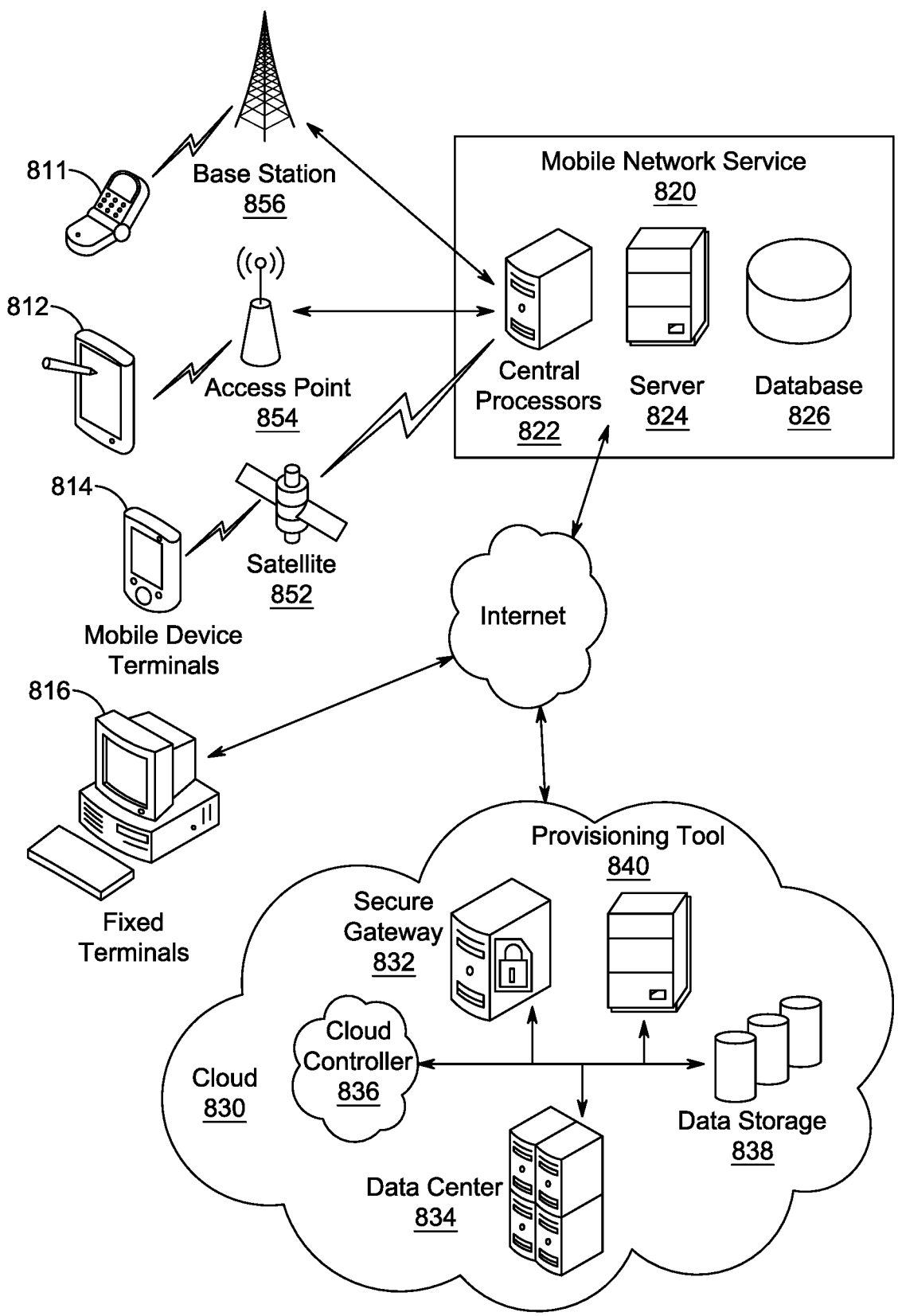
FIG. 8 is an illustration of a non-limiting example of distributed components which may share processing with the controller, according to aspects of the present disclosure.

The functions and features described herein can also be executed by various distributed components of a system. For example, one or more processors can execute these system functions, wherein the processors are distributed across multiple components communicating in a network. The distributed components can include one or more client and server machines, which can share processing, as shown by FIG. 8, in addition to various human interface and communication devices (e.g., display monitors, smart phones, tablets, personal digital assistants (PDAs)). More specifically, FIG. 8 illustrates client devices including a smart phone 811, a tablet 812, a mobile device terminal 814 and fixed terminals 816. These client devices can be commutatively coupled with a mobile network service 820 via base station 856, access point 854, satellite 852 or via an internet connection. Mobile network service 820 can comprise central processors 822, a server 824 and a database 826. Fixed terminals 816 and mobile network service 820 can be commutatively coupled via an internet connection to functions in cloud 830 that can comprise security gateway 832, data center 834, cloud controller 836, data storage 838 and provisioning tool 840. The network can be a private network, such as a LAN or WAN, or can be a public network, such as the Internet. Input to the system can be received via direct user input and received remotely either in real-time or as a batch process. Additionally, one or more aspects of the present disclosures can be performed on modules or hardware not identical to those described. Accordingly, other aspects of the present disclosures are within the scope that can be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the disclosure can be practiced otherwise than as specifically described herein.

The invention claimed is:

1. An unmanned aerial vehicle (UAV), comprising:
 a first battery configured to power a first plurality of electronic components of the UAV, a power consumption of each of the first plurality of electronic components being greater than a power threshold;
 a second battery configured to power a second plurality of electronic components of the UAV, a power consumption of each of the second plurality of electronic components being less than or equal to the power threshold;
 a generator configured to generate an electrical power from a mechanical power provided through rotation of a shaft of a motor of the UAV, wherein fan blades, the motor, and the generator of the UAV are mechanically connected through the shaft of the motor; and
 a battery management system (BMS) configured to:
 charge the first battery using the electrical power generated by the generator when the UAV is during operation and a stored charge of the first battery drops to a first predefined level,
 charge the second battery using the stored charge of the first battery when a stored charge of the second battery drops to a second predefined level, and
 control an electronic switch to start and stop the generator, the electronic switch being coupled between the generator and the shaft of the motor.

2. The UAV of claim 1, wherein the first plurality of electronic components includes at least one of the motor of the UAV and the BMS.

3. The UAV of claim 1, wherein the second plurality of electronic components includes at least one of a cooling system, a heating system, a wireless communication system, a lighting system, a sensing system, and a sound system.

4. The UAV of claim 3, wherein the cooling system of the UAV is configured to:
 cool a moving part or a payload of the UAV when the sensing system detects that a temperature of the moving part or the payload of the UAV is higher than a first temperature threshold.

5. The UAV of claim 4, wherein the moving part of the UAV includes the shaft of the motor.

6. The UAV of claim 3, wherein the heating system of the UAV is configured to:
 heat an electronic component or a payload of the UAV when the sensing system of the UAV detects that a temperature of the electronic component or the payload of the UAV is lower than a second temperature threshold.

7. The UAV of claim 3, wherein the wireless communication system of the UAV is configured to:
 send status data of the UAV to a ground station; and
 receive operation instructions from the ground station, the operation instructions being based on the status data of the UAV.

8. The UAV of claim 1, wherein the BMS of the UAV is further configured to:
 charge the second battery through a DC-DC convertor that is coupled to an output of the first battery.

9. The UAV of claim 1, wherein the BMS of the UAV is further configured to:
 charge the first battery through an AC-DC convertor that is coupled to a charging port of the UAV when the UAV is not during operation.

10. A method of operating an unmanned aerial vehicle (UAV), comprising:
 powering, by a first battery of the UAV, a first plurality of electronic components of the UAV, a power consumption of each of the first plurality of electronic components being greater than a power threshold;
 powering, by a second battery of the UAV, a second plurality of electronic components of the UAV, a power consumption of each of the second plurality of electronic components being less than or equal to the power threshold;
 generating, by a generator of the UAV, an electrical power from a mechanical power provided through rotation of a shaft of a motor of the UAV, wherein fan blades, the motor, and the generator of the UAV are mechanically connected through the shaft of the motor;
 charging, by a battery management system (BMS) of the UAV, the first battery using the electrical power generated by the generator when the UAV is during operation and a stored charge of the first battery drops to a first predefined level;
 charging, by the BMS of the UAV, the second battery using the stored charge of the first battery when a stored charge of the second battery drops to a second predefined level; and
 controlling, by the BMS of the UAV, an electronic switch to start and stop the generator, the electronic switch being coupled between the generator and the shaft of the motor.

11. The method of claim 10, wherein the first plurality of electronic components includes at least one of the motor of the UAV and the BMS.

12. The method of claim 10, wherein the second plurality of electronic components includes at least one of a cooling system, a heating system, a wireless communication system, a lighting system, a sensing system, and a sound system.

13. The method of claim 12, further comprising:
 cooling, by the cooling system of the UAV, a moving part or a payload of the UAV when the sensing system of the UAV detects that a temperature of the moving part or the payload of the UAV is higher than a first temperature threshold.

14. The method of claim 13, wherein the moving part of the UAV includes the shaft of the motor.

15. The method of claim 12, further comprising:
heating, by the heating system of the UAV, an electronic component or a payload of the UAV when the sensing system of the UAV detects that a temperature of the electronic component or the payload of the UAV is lower than a second temperature threshold.

16. The method of claim 12, further comprising:
sending, by the wireless communication system of the UAV, status data of the UAV to a ground station; and
receiving, by the wireless communication system of the UAV, operation instructions from the ground station, the operation instructions being based on the status data of the UAV.

17. The method of claim 10, wherein the charging the second battery comprises:
charging, by the BMS of the UAV, the second battery through a DC-DC convertor that is coupled to an output of the first battery.

18. The method of claim 10, further comprising:
charging, by the BMS of the UAV, the first battery through an AC-DC convertor that is coupled to a charging port of the UAV when the UAV is not during operation.

* * * * *